United States Patent Office 3,056,814
Patented Oct. 2, 1962

3,056,814
Δ²-ALLOPREGNENE DERIVATIVES
Albert Bowers and John Edwards, Mexico City, Mexico, assignors, by mesne assignments, to Syntex Corporation, a corporation of Panama
No Drawing. Filed Nov. 2, 1961, Ser. No. 149,502
20 Claims. (Cl. 260—397.45)

The present invention relates to novel cyclopentanophenanthrene derivatives and to a process for the production thereof.

More particularly the present invention relates to Δ²-cortical hormone derivatives.

The novel compounds of the present invention which exhibit high anti-inflammatory activity and have glucocortical, thymolytic, mineralo-cortical, anti-estrogenic, anti-gonadotrophic properties with low catabolic activity, are represented by the following formula:

In the above formula X represents $$\diagup\!\!\!\!\!\!^{OH}_{\cdot H} \quad \text{or} \quad =O$$

Y represents hydrogen, fluorine or chlorine; Z represents hydrogen, fluorine, chlorine or methyl; R represents hydrogen, α-methyl, β-methyl, α-hydroxy or α-hydrocarbon carboxylic acyloxy of less than 12 carbon atoms; $R^1$ represents hydrogen or a hydrocarbon carboxylic acyl group of less than 12 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

In the above formulas, R, $R^1$ and Z have the same meaning previously set forth; W represents fluorine or chlorine.

In practicing the process outlined above, the starting compound which is a hydrocortisone derivative (I) is treated conventionally with formaldehyde to give the corresponding 17,20;20,21-bismethylenedioxy derivative. Hydrogenation of the latter compound with, for example, hydrogen and a suitable catalyst such as 5% palladium on charcoal, followed by chromatographic separation affords the corresponding pregnane derivative and the corresponding allopregnane derivative (II). The last named compound, upon bromination with 1.1 mol equivalents of bromine in the presence of hydrogen bromide, furnishes the corresponding 2α-bromo-3-keto derivative (III). Reduction of the 3-keto group of this compound preferably with sodium borohydride yields of 3β-hydroxy derivative (IV) which upon treatment with a suitable reagent such as chromous chloride solution, affords the respective Δ²-allopregnene derivative. The 17,20;20,21-bismethylenedioxy group of the last named compound is conventionally hydrolyzed in an acid medium, such as 80% acetic acid to give the corresponding Δ²-allopregnene-17α,21-diol-20-one derivative (V: R¹=H).

The 16α- and/or 21-hydroxyl groups present in the molecule of this latter derivative, are conventionally acylated in pyridine with an acylating agent, preferably acetic anhydride to give the corresponding 16α,21-diester or 21-monoester Δ²-allopregnene derivative (V: R¹=acyl).

Addition of bromine to the Δ²-double bond affords the respective 2β,3α-dibromo-allopregnane compound (VI: R¹=acyl).

A double bond is introduced between C-9 and C-11 of the molecule of the last named compound by dehydration with mesyl chloride in dimethylformamide, thus obtaining the corresponding 2α,3α-dibromo-Δ⁹⁽¹¹⁾-allopregnene derivative (VII: R¹=acyl). Treatment of this compound with a bromoamide such as N-bromoacetamide in the presence of a mild acid, preferably perchloric acid, in a suitable solvent such as dioxane, furnishes the corresponding 9α-bromo-11β-hydroxy-allopregnane derivative which upon reaction with a mild base, preferably potassium acetate affords the respective 9β,11β-oxido-allopregnane compound. The opening of the 9β,11β-oxide ring with hydrogen fluoride or hydrogen chloride leads to the formation of the corresponding 9α-fluoro or 9α-chloro-11β-hydroxy compound (VIII: R¹=acyl). Debromination of this compound with a suitable agent such as sodium iodide in methyl ethyl ketone, affords the respective Δ²-allopregnene derivative (IX: R¹=acyl). Oxidation of the 11β-hydroxy-Δ²-allopregnene derivative (V: R¹=acyl) and the 9α-halo-11β-hydroxy-Δ²-allopregnene derivative (IX: R¹=acyl) furnishes the corresponding 11-keto compound.

Conventional saponification of the 16α,21-diester or 21-monoester derivatives of the 11β-hydroxy compounds (V: R¹=acyl and IX: R¹=acyl) and of the corresponding 11-keto compounds affords the corresponding Δ²-allopregnene-11β,17α,21-triol-20-one derivatives (V: R¹=H and IX: R¹=H) and Δ²-allopregnene-17α,21-diol-3,11,20-trione derivatives.

Conventional acylation of these free alcohols in pyridine with an acylating agent such as an anhydride of a hydrocarbon carboxylic acid of the type defined hereinbefore, furnishes the corresponding acylates which may be different from the esters preceding the saponification.

The following specific examples serve to illustrate but are not intended to limit the scope of the present invention:

*Example I*

A solution of 6 g. of 6α,16β-dimethyl-Δ⁴-pregnen-11β,17α,21-triol-3,20-dione (Djerassi, U.S. Patent Application Serial No. 796,766 filed March 3, 1959) in 50 cc. of 37% aqueous formaldehyde was treated with 0.5 cc. of concentrated hydrochloric acid and the mixtures stirred for 48 hours at room temperature. It was then poured into water, the formed precipitate filtered off, washed with water to neutral and dried under vacuum thus affording 6α,16β-dimethyl-17,20;20,21 - bismethylenedioxy-Δ⁴-pregnen-11β-ol-3-one.

When applying the above described procedure to the starting compounds listed below, there were obtained the corresponding products hereinafter set forth:

| Starting compounds | Products |
| --- | --- |
| 16α-methyl-6α-fluoro-Δ⁴-pregnene-11β,17α,21-triol-3,20-dione. | 16α-methyl-6α-fluoro-17,20;20,21-bismethylenedioxy-Δ⁴-pregnen-11β-ol-3-one. |
| 16α-methyl-6α-chloro-Δ⁴-pregnene-11β,17α,21-triol-3,20-dione. (Djerassi et al, copending application Serial No. 825,665 filed July 8, 1959.) | 16α-methyl-6α-chloro-17,20;20,21-bismethylenedioxy-Δ⁴-pregnen-11β-ol-3-one. |
| 16β-methyl-6α-fluoro-Δ⁴-pregnene-11β,17α,21-triol-3,20-dione. (Djerassi, copending application Serial No. 792,962 filed February 13, 1959.) | 16β-methyl-6α-fluoro-17,20;20,21-bismethylenedioxy-Δ⁴-pregnen-11β-ol-3-one. |
| 6α-fluoro-Δ⁴-pregnene-11β,16α,17α,21-tetrol-3,20-dione. | 6α-fluoro-17,20;20,21-bismethylenedioxy-Δ⁴-pregnene-11β,16α-diol-3-one. |
| 6α-chloro-Δ⁴-pregnene-11β,16α,17α,21-tetrol-3,20-dione. | 6α-chloro-17,20;20,21-bismethylenedioxy-Δ⁴-pregnene-11β,16α-diol-3-one. |
| 6α-chlorohydrocortisone | 6α-chloro-17,20;20,21-bismethylenedioxy-Δ⁴-pregnene-11β-ol-3-one. |
| Hydrocortisone | 17,20;20,21-bismethylenedioxy-Δ⁴-pregnene-11β-ol-3-one. |

*Example II*

6 g. of 6α,16β-dimethyl-17,20;20-21-bismethylenedioxy-Δ⁴-pregnen-11β-ol-3-one dissolved in 300 cc. of ethyl acetate, was hydrogenated overnight in the presence of 1.8 g. of a 5% palladium-on-charcoal catalyst at atmospheric pressure and room temperature. Removal of catalyst and solvent furnished a residue. Alumina chromatography afforded two products which upon recrystallization gave 6α,16β-dimethyl-17,20;20,21-bismethylenedioxy-pregnan-11β-ol-3-one and 6α,16β-dimethyl-17,20;20,21-bismethylenedioxy-allopregnan-11β-ol-3-one.

The starting compounds listed below were treated following the above procedure, thus furnishing the corresponding products hereinafter set forth:

| Starting compounds | Products |
| --- | --- |
| 16α-methyl-6α-fluoro-17,20;20,21-bismethylenedioxy-Δ⁴-pregnen-11β-ol-3-one. | 16α-methyl-6α-fluoro-17,20;20,21-bismethylenedioxy-pregnan-11β-ol-3-one. 16α-methyl-6α-fluoro-17,20;20,21-bismethylenedioxy-allopregnan-11β-ol-3-one. |
| 16α-methyl-6α-chloro-17,20;20,21-bismethylenedioxy-Δ⁴-pregnen-11β-ol-3-one. | 16α-methyl-6α-chloro-17,20;20,21-bismethylenedioxy-pregnan-11β-ol-3-one. 16α-methyl-6α-chloro-17,20;20,21-bismethylenedioxy-allopregnan-11β-ol-3-one. |
| 16β-methyl-6α-fluoro-17,20;20,21-bismethylenedioxy-Δ⁴-pregnen-11β-ol-3-one. | 16β-methyl-6α-fluoro-17,20;20,2-bismethylenedioxy-pregnan-11β-ol-3-one. 16β-methyl-6α-fluoro-17,20;20,21-bismethylenedioxy-allopregnan-11β-ol-3-one. |
| 6α-fluoro-17,20;20,21-bismethylenedioxy-Δ⁴-pregnene-11β,16α-diol-3-one. | 6α-fluoro-17,20;20,21-bismethylenedioxy-pregnane-11β,16α-diol-3-one. 6α-fluoro-17,20;20,21-bismethylenedioxy-allopregnane-11β,16α-diol-3-one. |
| 6α-chloro-17,20;20,21-bismethylenedioxy-Δ⁴-pregnene-11β,16α-diol-3-one. | 6α-chloro-17,20;20,21-bismethylenedioxy-pregnane-11β,16α-diol-3-one. 6α-chloro-17,20;20,21-bismethylenedioxy-allopregnane-11β, 16α-diol-3-one. |
| 6α-chloro-17,20;20,21-bismethylenedioxy-Δ⁴-pregnen-11β-ol-3-one. | 6α-chloro-17,20;20,21-bismethylenedioxy-pregnan-11β-ol-3-one. 6α-chloro-17,20;20,21-bismethylenedioxy-allopregnan-11β-ol-3-one. |
| 17,20;20,21-bismethylenedioxy-Δ⁴-pregnen-11β-ol-3-one. | 17,20;20,21-bismethylenedioxy-pregnan-11β-ol-3-one. 17,20;20,21-bismethylenedioxy-allopregnan-11β-ol-3-one. |

*Example III*

A solution of 5 g. of 6α,16β-dimethyl-17,20;29,21-bismethylenedioxy-allopregnan-11β-ol-3-one in 100 cc. of acetic acid was treated with a few drops of hydrogen bromide in acetic acid and subsequently dropwise and under stirring with a solution of 1.1 molar equivalents of bromine in 50 cc. of acetic acid. After all the bromine had been consumed, water was added, the formed precipitate was filtered, washed with water to neutral and dried under vacuum. Recrystallization from acetone-hexane yielded 6α,16β-dimethyl-2α-bromo-17,20;20,21-bismethylenedioxy-allopregnan-11β-ol-3-one.

When applying the above technique to the starting compounds listed below, there were obtained the corresponding products hereinafter set forth:

| Starting compounds | Products |
|---|---|
| 16α-methyl-6α-fluoro-17,20;20,21-bismethylenedioxy-allopregnan-11β-ol-3-one. | 16α-methyl-2α-bromo-6α-fluoro-17,20;20,21-bismethylenedioxy-allopregnan-11β-ol-3-one. |
| 16α-methyl-6α-chloro-17,20;20,21-bismethylenedioxy-allopregnan-11β-ol-3-one. | 16α-methyl-2α-bromo-6α-chloro-17,20;20,21-bismethylenedioxy-allopregnan-11β-ol-3-one. |
| 16β-methyl-6α-fluoro-17,20;20,21-bismethylenedioxy-allopregnan-11β-ol-3-one. | 16β-methyl-2α-bromo-6α-fluoro-17,20;20,21-bismethylenedioxy-allopregnan-11β-ol-3-one. |
| 6α-fluoro-17,20;20,21-bismethylenedioxy-allopregnan-11β,16α-diol-3-one. | 2α-bromo-6α-fluoro-17,20;20,21-bismethylenedioxy-allopregnan-11β,16α-diol-3-one. |
| 6α-chloro-17,20;20,21-bismethylenedioxy-allopregnane-11β,16α-diol-3-one. | 2α-bromo-6α-chloro-17,20;20,21-bismethylenedioxy-allopregnane-11β,16α-diol-3-one. |
| 6α-chloro-17,20;20,21-bismethylenedioxy-allopregnan-11β-ol-3-one. | 2α-bromo-6α-chloro-17,20;20,21-bismethylenedioxy-allopregnan-11β-ol-3-one. |
| 17,20;20,21-bismethylenedioxy-allopregnan-11β-ol-3-one. | 2α-bromo-17,20;20,21-bismethylenedioxy-allopregnan-11β-ol-3-one. |

*Example IV*

A solution of 3 g. of sodium borohydride in 9 cc. of water was added to an ice-cooled solution of 5 g. of 6α,16β-dimethyl-2α-bromo-17,20;20,21-bismethylenedioxy-allopregnan-11β-ol-3-one, in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 6α,16β-dimethyl-2α-bromo-17,20;20,21-bismethylenedioxy-allopregnan-3β,11β-diol.

The starting compounds listed below were treated by the above described technique furnishing the corresponding products disclosed hereinafter:

| Starting compounds | Products |
|---|---|
| 16α-methyl-2α-bromo-6α-fluoro-17,20;20,21-bismethylenedioxy-allopregnan-11β-ol-3-one. | 16α-methyl-2α-bromo-6α-fluoro-17,20;20,21-bismethylenedioxy-allopregnan-3β,11β-diol. |
| 16α-methyl-2α-bromo-6α-chloro-17,20;20,21-bismethylenedioxy-allopregnan-11β-ol-3-one. | 16α-methyl-2α-bromo-6α-chloro-17,20;20,21-bismethylenedioxy-allopregnan-3β,11β-diol. |
| 16β-methyl-2α-bromo-6α-fluoro-17,20;20,21-bismethylenedioxy-allopregnan-11β-ol-3-one. | 16β-methyl-2α-bromo-6α-fluoro-17,20;20,21-bismethylenedioxy-allopregnane-3β,11β-diol. |
| 2α-bromo-6α-fluoro-17,20;20,21-bismethylenedioxy-allopregnane-11β,16α-diol-3-one. | 2α-bromo-6α-fluoro-17,20;20,21-bismethylenedioxy-allopregnane-3β,11β,16α-triol. |
| 2α-bromo-6α-chloro-17,20;20,21-bismethylenedioxy-allopregnane-11β,16α-diol-3-one. | 2α-bromo-6α-chloro-17,20;20,21-bismethylenedioxy-allopregnane-3β,11β,16α-triol. |
| 2α-bromo-6α-chloro-17,20;20,21-bismethylenedioxy-allopregnan-11β-ol-3-one. | 2α-bromo-6α-chloro-17,20;20,21-bismethylenedioxy-allopregnane-3β,11β-diol. |
| 2α-bromo-17,20;20,21-bismethylenedioxy-allopregnan-11β-ol-3-one. | 2α-bromo-17,20;20,21-bismethylenedioxy-allopregnane-3β,11β-diol. |

*Example V*

To a solution of 2 g. of 6α,16β-dimethyl-2α-bromo-17,20;20,21-bismethylenedioxy-allopregnan-3β,11β-diol in 200 cc. of acetone at room temperature, there were added 60 cc. of freshly prepared chromous chloride solution. After 5 minutes the acetone was removed under reduced pressure, water was added and the precipitate filtered off and dried. Recrystallization from acetone-hexane yielded 6α,16β-dimethyl-17,20;20,21-bismethylenedioxy-Δ²-allopregnen-11β-ol.

By the same procedure, there were treated the starting materials listed below, affording the corresponding products hereinafter disclosed:

| Starting compounds | Products |
|---|---|
| 16α-methyl-2α-bromo-6α-fluoro-17,20;20,21-bismethylenedioxy-allopregnane-3β,11β-diol. | 16α-methyl-6α-fluoro-17,20;20,21-bismethylenedioxy-Δ²-allopregnen-11β-ol. |
| 16α-methyl-2α-bromo-6α-chloro-17,20;20,21-bismethylenedioxy-allopregnane-3β,11β-diol. | 16α-methyl-6α-chloro-17,20;20,21-bismethylenedioxy-Δ²-allopregnen-11β-ol. |
| 16β-methyl-2α-bromo-6α-fluoro-17,20;20,21-bismethylenedioxy-allopregnane-3β,11β-diol. | 16β-methyl-6α-fluoro-17,20;20,21-bismethylenedioxy-Δ²-allopregnen-11β-ol. |
| 2α-bromo-6α-fluoro-17,20;20,21-bismethylenedioxy-allopregnane-3β,11β,16α-triol. | 6α-fluoro-17,20;20,21-bismethylenedioxy-Δ²-allopregnene-11β,16α-diol. |
| 2α-bromo-6α-chloro-17,20;20,21-bismethylenedioxy-allopregnane-3β,11β,16α-triol. | 6α-chloro-17,20;20,21-bismethylenedioxy-Δ²-allopregnene-11β,16α-diol. |
| 2α-bromo-6α-chloro-17,20;20,21-bismethylenedioxy-allopregnane-3β,11β-diol. | 6α-chloro-17,20;20,21-bismethylenedioxy-Δ²-allopregnen-11β-ol. |
| 2α-bromo-17,20;20,21-bismethylenedioxy-allopregnan-3β,11β-diol. | 17,20;20,21-bismethylenedioxy-Δ²-allopregnen-11β-ol. |

*Example VI*

1 g. of 6α,16β-dimethyl-17,20;20,21-bismethylenedioxy-Δ²-allopregnen-11β-ol was heated on the steam bath with 100 cc. of 80% acetic acid under nitrogen for 2 hours, it was then concentrated under vacuum to a small volume and poured into water. The precipitate was collected, washed well with water, dried and recrystallized from acetone-hexane, thus furnishing 6α,16β-dimethyl-Δ²-allopregnene-11β,17α,21-triol-20-one.

When applying the above procedure to the starting compounds listed below, there were obtained the products hereinafter set forth:

| Starting compounds | Products |
|---|---|
| 16α-methyl-6α-fluoro-17,20;20,21-bismethylenedioxy-Δ²-allopregnen-11β-ol. | 16α-methyl-6α-fluoro-Δ²-allopregnene-11β-17α,21-triol-20-one. |
| 16α-methyl-6α-chloro-17,20;20,21-bismethylenedioxy-Δ²-allopregnen-11β-ol. | 16α-methyl-6α-chloro-Δ²-allopregnene-11β,17α,21-triol-20-one. |
| 16β-methyl-6α-fluoro-17,20;20,21-bismethylenedioxy-Δ²-allopregnen-11β-ol. | 16β-methyl-6α-fluoro-Δ²-allopregnene-11β,17α,21-triol-20-one. |
| 6α-fluoro-17,20;20,21-bismethylenedioxy-Δ²-allopregnene-11β,16α-diol. | 6α-fluoro-Δ²-allopregnene-11β,16α,17α,21-tetrol-20-one. |
| 6α-chloro-17,20;20,21-bismethylenedioxy-Δ²-allopregnene-11β,16α-diol. | 6α-chloro-Δ²-allopregnene-11β,16α,17α,21-tetrol-20-one. |
| 6α-chloro-17,20;20,21-bismethylenedioxy-Δ²-allopregnen-11β-ol. | 6α-chloro-Δ²-allopregnene-11β,17α,21-triol-20-one. |
| 17,20;20,21-bismethylenedioxy-Δ²-allopregnen-11β-ol. | Δ²-allopregnene-11β,17α,21-triol-20-one. |

*Example VII*

A mixture of 1 g. of 6α,16β-dimethyl-Δ²-allopregnene-11β,17α,21-triol-20-one, 4 cc. of pyridine and 2 cc. of acetic anhydride was kept at room temperature overnight, poured into ice water, the formed precipitate was filtered, washed with water and dried. Crystallization from acetone-hexane gave the 21-acetate of 6α,16β-dimethyl-Δ²-allopregnene-11β,17α,21-triol-20-one.

By the same technique, there were acetylated the starting compounds listed below, affording the corresponding products hereinafter disclosed:

| Starting compounds | Products |
|---|---|
| 16α-methyl-6α-fluoro-Δ²-allopregnene-11β,17α,21-triol-20-one. | 16α-methyl-6α-fluoro-Δ²-allopregnene-11β,17α,21-triol-20-one-21-acetate. |
| 16α-methyl-6α-chloro-Δ²-allopregnene-11β,17α,21-triol-20-one. | 16α-methyl-6α-chloro-Δ²-allopregnene-11β,α17,21-triol-20-one-21-acetate. |
| 16β-methyl-6α-fluoro-Δ²-allopregnene-11β,17α,21-triol-20-one. | 16β-methyl-6α-fluoro-Δ²-allopregnene-11β,17α,21-triol-20-one-21-acetate. |
| 6α-fluoro-Δ²-allopregnene-11β,16α,17α,21-tetrol-20-one. | 6α-fluoro-Δ²-allopregnene-11β,16α,17α,21-tetrol-20-one-16,21-diacetate. |
| 6α-chloro-Δ²-allopregnene-11β,16α,17α,21-tetrol-20-one. | 6α-chloro-Δ²-allopregnene-11β,16α,17α,21-tetrol-20-one-16,21-diacetate. |
| 6α-chloro-Δ²-allopregnene-11β,17α,21-triol-20-one. | 6α-chloro-Δ²-allopregnene-11β,17α,21-triol-20-one-21-acetate. |
| Δ²-allopregnene-11β,17α,21-triol-20-one. | Δ²-allopregnene-11β,17α,21-triol-20-one-21-acetate. |

Example VIII

A solution of 4 g. of 6α,16β-dimethyl-Δ²-allopregnene-11β,17α,21-triol-20-one-21-acetate obtained in accordance with Example VII in 100 cc. of chloroform containing a few drops of pyridine was cooled to 0° C. and slowly treated under stirring with a cooled solution of bromine in chloroform containing 1.05 molar equivalents of bromine. The mixture was allowed to reach room temperature, washed with 5% aqueous sodium bicarbonate solution and subsequently with water, dried over anhydrous sodium sulfate and evaporated to dryness. Crystallization of the residue from methanol-benzene afforded 6α,16β - dimethyl - 2β,3α - dibromo - allopregnane - 11β,17α,21-triol-20-one-21-acetate.

Following the above technique, there was treated the starting compounds listed below, furnishing the corresponding products hereinafter disclosed:

| Starting compounds | Products |
| --- | --- |
| 16α-methyl-6α-fluoro-Δ²-allopregnene-11β,17α,21-triol-20-one-21-acetate. | 16α-methyl-2β,3α-dibromo-6α-fluoro-allopregnane-11β,17α,21-triol-20-one-21-acetate. |
| 16α-methyl-6α-chloro-Δ²-allopregnene-11β,17α,21-triol-20-one-21-acetate. | 16α-methyl-2β,3α-dibromo-6α-chloro-allopregnane-11β,17α,21-triol-20-one-21-acetate. |
| 16β-methyl-6α-fluoro-Δ²-allopregnene-11β,17α,21-triol-20-one-21-acetate. | 16β-methyl-2β,3α-dibromo-6α-fluoro-allopregnane-11β,17α,21-triol-20-one-21-acetate. |
| 6α-fluoro-Δ²-allopregnene-11β,16α,17α,21-tetrol-20-one-16,21-diacetate. | 2β,3α-dibromo-6α-fluoro-allopregnane-11β,16α,17α,21-tetrol-20-one-16,21-diacetate. |
| 6α-chloro-Δ²-allopregnene-11β,16α,17α,21-tetrol-20-one-16,21-diacetate. | 2β,3α-dibromo-6α-chloro-allopregnane-11β,16α,17α,21-tetrol-20-one-16,21-diacetate. |
| 6α-chloro-Δ²-allopregnene-11β,17α,21-triol-20-one-21-acetate. | 2β,3α-dibromo-6α-chloro-allopregnane-11β,17α,21-triol-20-one-21-acetate. |
| Δ²-allopregnene-11β,17α,21-triol-20-one-21-acetate. | 2β,3α-dibromo-allopregnane-11β,17α,21-triol-20-one-21-acetate. |

Example IX 5 g. of 6α,16β-dimethyl-2β,3α-dibromo-allopregnane-11β,17α,21-triol-20-one-21-acetate was dissolved with slow heating in 60 cc. of dimethylformamide, the mixture was cooled, 2 g. of mesyl chloride and 2.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 6α,16β - dimethyl - 2β,3α - dibromo - Δ⁹⁽¹¹⁾ - allopregnene-17α-21-diol-20-one-21-acetate.

The starting compounds hereinafter listed were treated following the above described procedure, thus affording the corresponding products disclosed below:

| Starting compounds | Products |
| --- | --- |
| 16α-methyl-2β,3α-dibromo-6α-fluoro-allopregnane-11β,17α,21-triol-20-one-21-acetate. | 16α-methyl-2β,3α-dibromo-6α-fluoro-Δ⁹⁽¹¹⁾-allopregnene-17α,21-diol-20-one-21-acetate. |
| 16α-methyl-2β,3α-dibromo-6α-chloro-allopregnane 11β,17α,21-triol-20-one-21-acetate. | 16α-methyl-2β,3α-dibromo-6α-chloro-Δ⁹⁽¹¹⁾-allopregnene-17α,21-diol-20-one-21-acetate. |
| 16β-methyl-2β,3α-dibromo-6α-fluoro-allopregnane-11β,17α,21-triol-20-one-21-acetate. | 16β-methyl-2β,3α-dibromo-6α-fluoro-Δ⁹⁽¹¹⁾-allopregnene-17α,21-diol-20-one-21-acetate. |
| 2β,3α-dibromo-6α-fluoro-allopregnane-11β,16α,17α,21-tetrol-20-one-16,21-diacetate. | 2β,3α-dibromo-6α-fluoro-Δ⁹⁽¹¹⁾-allopregnene-16α,17α,21-triol-20-one-16,21-diacetate. |
| 2β,3α-dibromo-6α-chloro-allopregnane-11β,16α,17α,21-tetrol-20-one-16,21-diacetate. | 2β,3α-dibromo-6α-chloro-Δ⁹⁽¹¹⁾-allopregnene-16α,17α,21-triol-20,one-16,21-diacetate. |
| 2β,3α-dibromo-6α-chloro-allopregnane-11β,17α,21-triol-20-one-21-acetate. | 2β,3α-dibromo-6α-chloro-Δ⁹⁽¹¹⁾-allopregnene-17α,21-diol-20-one-21-acetate. |
| 2β,3α-dibromo-allopregnane-11β,17α,21-triol-20-one-21-acetate. | 2β,3α-dibromo-Δ⁹⁽¹¹⁾-allopregnene-17α,21-diol-20-one-21-acetate. |

Example X 2.8 g. of N-bromoacetamide were added to a mixture of 5 g. of 6α,16β-dimethyl-2β,3α-dibromo-Δ⁹⁽¹¹⁾-allopregnene-17α,21-diol-20-one-21-acetate, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone, there was obtained the corresponding 9α-bromo-11β-hydroxy-allopregnane derivative.

A mixture of 2 g. of anhydrous potassium acetate and 20 cc. of acetone was heated almost to boiling and then a solution of 1.7 g. of the above bromohydrin in 20 cc. of acetone was added slowly while stirring; the mixture was then refluxed for 10 hours; cooled, and almost all of the acetone was distilled off; iced water was then added, the precipitate was filtered, washed with water and dried. Upon recrystallization from methylene chloride-benzene, there was obtained 6α,16β-dimethyl-2β,3α-dibromo-9β,11β-oxido-allopregnane-17α,21-diol-20-one-21-acetate.

When applying the above technique to the starting compounds listed below, there were obtained the products hereinafter disclosed:

| Starting compounds | Products |
| --- | --- |
| 16α-methyl-2β,3α-dibromo-6α-fluoro-Δ⁹⁽¹¹⁾-allopregnene-17α,21-diol-20-one-21-acetate. | 16α-methyl-2β,3α-dibromo-6α-fluoro-9β,11β-oxido-allopregnane-17α,21-diol-20-one-21-acetate. |
| 16α-methyl-2β,3α-dibromo-6α-chloro-Δ⁹⁽¹¹⁾-allopregnene-17α,21-diol-20-one-21-acetate. | 16α-methyl-2β,3α-dibromo-6α-chloro-9β,11β-oxido-allopregnane-17α,21-diol-20-one-21-acetate. |
| 16β-methyl-2β,3α-dibromo-6α-fluoro-Δ⁹⁽¹¹⁾-allopregnene-17α,21-diol-20-one-21-acetate. | 16β-methyl-2β,3α-dibromo-6α-fluoro-9β,11β-oxido-allopregnane-17α,21-diol-20-one-21-acetate. |
| 2β,3α-dibromo-6α-fluoro-Δ⁹⁽¹¹⁾-allopregnene-16α,17α,21-triol-20-one-16,21-diacetate. | 2β,3α-dibromo-6α-fluoro-9β,11β-oxido-allopregnane-16α,17α,21-triol-20-one-16,21-diacetate. |
| 2β,3α-dibromo-6α-chloro-Δ⁹⁽¹¹⁾-allopregnene-17α,21-diol-20-one-21-acetate. | 2β,3α-dibromo-6α-chloro-9β,11β-oxido-allopregnane-17α,21-diol-20-one-21-acetate. |
| 2β,3α-dibromo-Δ⁹⁽¹¹⁾-allopregnene-17α,21-diol-20-one-21-acetate. | 2β,3α-dibromo-9β,11β-oxido-allopregnane-17α,21-diol-20-one-21-acetate. |

Example XI

To a solution of 4 g. of 6α,16β-dimethyl-2β,3α-dibromo-9β,11β - oxido - allopregnane - 17α,21 - diol - 20 - one-21-acetate in 40 cc. of redistilled chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with water and the chloroform layer was separated, washed with aqueous sodium bicarbonate solution and then with water, dried over anhydrous sodium sulfate and the chloroform was evaporated under reduced pressure. Crystallization of the residue gave 6α,16β-dimethyl - 2β,3α - dibromo - 9α - chloro - allopregnane-11β,17α,21-triol-20-one-21-acetate.

Following the above described procedure, there were treated the hereinafter indicated starting compounds, furnishing the products disclosed below:

| Starting compounds | Products |
|---|---|
| 16α-methyl-2β,3α-dibromo-6α-fluoro-9β,11β-oxido-allopregnane-17α,21-diol-20-one-21-acetate. | 16α-methyl-2β,3α-dibromo-6α-fluoro-9α-chloro-allopregnane-11β,17α,21-triol-20-one-21-acetate. |
| 16α-methyl-2β,3α-dibromo-6α-chloro-9β,11β-oxido-allopregnane-17α,21-diol-20-one-21-acetate. | 16α-methyl-2β,3α-dibromo-6α,9α-dichloro-allopregnane-11β,17α,21-triol-20-one-21-acetate. |
| 16β-methyl-2β,3α-dibromo-6α-fluoro-9β,11β-oxido-allopregnane-17α,21-diol-20-one-21-acetate. | 16β-methyl-2β,3α-dibromo-6α-fluoro-9α-chloro-allopregnane-11β,17α,21-triol-20-one-21-acetate. |
| 2β,3α-dibromo-6α-fluoro-9β,11β-oxido-allopregnane-16α,17α,21-triol-20-one-16,21-diacetate. | 2β,3α-dibromo-6α-fluoro-9α-chloro-allopregnane-11β,16α,17α,21-tetrol-20-one-16,21-diacetate. |
| 2β,3α-dibromo-6α-chloro-9β,11β-oxido-allopregnane-16α,17α,21-triol-20-one-16,21-diacetate. | 2β,3α-dibromo-6α,9α-dichloro-allopregnane-11β,16α,17α,21-tetrol-20-one-16,21-diacetate. |
| 2β,3α-dibromo-6α-chloro-9β,11β-oxido-allopregnane-17α,21-diol-20-one-21-acetate. | 2β,3α-dibromo-6α,9α-dichloro-allopregnane-11β,17α,21-triol-20-one-21-acetate. |
| 2β,3α-dibromo-9β,11β-oxido-allopregnane-17α,21-diol-20-one-21-acetate. | 2β,3α-dibromo-9α-chloro-allopregnane-11β,17α,21-triol-20-one-21-acetate. |

Example XII

In a polyethylene flask, adapted with a magnetic stirrer, there was dissolved 1.8 g. of 6α,16β-dimethyl-2β,3α-dibromo-9β,11β-oxidoallopregnane-17α,21-diol-20-one - 21-acetate in 30 cc. of methylene chloride; the solution was cooled at 0° C. and a solution of a mixture of 2.11 g. of anhydrous hydrofluoric acid and 3.7 g. of tetrahydrofuran cooled in a Dry-Ice acetone bath (−70° C.) while stirring, was added during a period of 20 minutes. The mixture was stirred at less than 10° C. for 6 additional hours, was neutralized by cautiously adding a 5% aqueous sodium bicarbonate solution, was then transferred to a separatory funnel, and the organic layer was washed with water, dried over anhydrous sodium sulfate and concentrated until formation of an abundant precipitate. The mixture was cooled, the precipitate was filtered and redissolved in hot ethyl acetate, the hot insoluble material was filtered and the filtrate cooled whereby 6α,16β-dimethyl-2β,3α-dibromo-9α-fluoro-allopregnane - 11β,17α,21-triol-20-one-21-acetate crystallized.

Following the above described procedure, there were treated the hereinafter indicated starting compounds, furnishing the products disclosed below.

| Starting compounds | Products |
|---|---|
| 16α-methyl-2β,3α-dibromo-6α-fluoro-9β,11β-oxido-allopregnane-17α,21-diol-20-one-21-acetate. | 16α-methyl-2β,3α-dibromo-6α,9α-difluoro-allopregnane-11β,17α,21-triol-20-one-21-acetate. |
| 16α-methyl-2β,3α-dibromo-6α-chloro-9β,11β-oxido-allopregnane-17α,21-diol-20-one-21-acetate. | 16α-methyl-2β,3α-dibromo-6α-chloro-9α-fluoro-allopregnane-11β,17α,21-triol-20-one-21-acetate. |
| 16β-methyl-2β,3α-dibromo-6α-fluoro-9β,11β-oxido-allopregnane-17α,21-diol-20-one-21-acetate. | 16β-methyl-2β,3α-dibromo-6α,9α-difluoro-allopregnane-11β,17α,21-triol-20-one-21-acetate. |
| 2β,3α-dibromo-6α-fluoro-9β,11β-oxido-allopregnane-16α,17α,21-triol-20-one-16,21-diacetate. | 2β,3α-dibromo-6α,9α-difluoro-allopregnane-11β,16α,17α,21-tetrol-20-one-16,21-diacetate. |
| 2β,3α-dibromo-6α-chloro-9β,11β-oxido-allopregnane-16α,17α,21-triol-20-one-16,21-diacetate. | 2β,3α-dibromo-6α-chloro-9α-fluoro-allopregnane-11β,16α,17α,21-tetrol-20-one-16,21-diacetate. |
| 2β,3α-dibromo-6α-chloro-9β,11β-oxido-allopregnane-17α,21-diol-20-one-21-acetate. | 2β,3α-dibromo-6α-chloro-9α-fluoro-allopregnane-11β,17α,21-triol-20-one-21-acetate. |
| 2β,3α-dibromo-9β,11β-oxido-allopregnane-17α,21-diol-20-one-21-acetate. | 2β,3α-dibromo-9α-fluoro-allopregnane-11β,17α,21-triol-20-one-21-acetate. |

Example XIII

A mixture of 2 g. of 6α,16β-dimethyl-2β,3α-dibromo-9α-chloroallopregnane-11β,17α,21-triol-20-one-21-acetate, 2 g. of sodium iodide and 50 cc. of methyl ethyl ketone was refluxed for 8 hours. It was then cooled, poured into water and extracted with ethyl acetate. The organic extract was washed with aqueous sodium bisulfite solution, water, dried over anhydrous sodium sulfate and evaporated to dryness. Crystallization of the residue from acetone-hexane yielded 6α,16β-dimethyl-9α-chloro-Δ²-allopregnene-11β,17α,21-triol-20-one-21-acetate.

Upon treatment by the same procedure of the starting compounds listed below, there were obtained the corresponding products hereinafter disclosed:

| Starting compounds | Products |
|---|---|
| 6α,16β-dimethyl-2β,3α-dibromo-9α-fluoro-allopregnane-11β,17α,21-triol-20-one-21-acetate. | 6α,16β-dimethyl-9α-fluoro-Δ²-allopregnene-11β,17α,21-triol-20-one-21-acetate. |
| 16α-methyl-2β,3α-dibromo-6α-fluoro-9α-chloro-allopregnane-11β,17α,21-triol-20-one-21-acetate. | 16α-methyl-6α-fluoro-9α-chloro-Δ²-allopregnene-11β,17α,21-triol-20-one-21-acetate. |
| 16α-methyl-2β,3α-dibromo-6α,9α-dichloro-allopregnane-11β,17α,21-triol-20-one-21-acetate. | 16α-methyl-6α,9α-dichloro-Δ²-allopregnene-11β,17α,21-triol-20-one-21-acetate. |
| 16β-methyl-2β,3α-dibromo-6α-fluoro-9α-chloro-allopregnane-11β,17α,21-triol-20-one-21-acetate. | 16β-methyl-6α-fluoro-9α-chloro-Δ²-allopregnene-11β,17α,21-triol-20-one-21-acetate. |
| 2β,3α-dibromo-6α-fluoro-9α-chloro-allopregnane-11β,16α,17α,21-tetrol-20-one-16,21-diacetate. | 6α-fluoro-9α-chloro-Δ²-allopregnene-11β,16α,17α,21-tetrol-20-one-16,21-diacetate. |
| 2β,3α-dibromo-6α,9α-dichloro-allopregnane-11β,16α,17α,21-tetrol-20-one-16,21-diacetate. | 6α,9α-dichloro-Δ²-allopregnene-11β,16α,17α,21-tetrol-20-one-16,21-diacetate. |
| 2β,3α-dibromo-6α,9α-dichloro-allopregnane-11β,17α,21-triol-20-one-21-acetate. | 6α,9α-dichloro-Δ²-allopregnene-11β,17α,21-triol-20-one-21-acetate. |
| 2β,3α-dibromo-9α-chloro-allopregnane-11β,17α,21-triol-20-one-21-acetate. | 9α-chloro-Δ²-allopregnene-11β,17α,21-triol-20-one-21-acetate. |
| 16β-methyl-2β,3α-dibromo-6α,9α-difluoro-allopregnane-11β,17α,21-triol-20-one-21-acetate. | 16α-methyl-6α,9α-difluoro-Δ²-allopregnene-11β,17α,21-triol-20-one-21-acetate. |
| 16α-methyl-2β,3α-dibromo-6α-chloro-9α-fluoro-allopregnane-11β,17α,21-triol-20-one-21-acetate. | 16α-methyl-6α-chloro-9α-fluoro-Δ²-allopregnene-11β,17α,21-triol-20-one-21-acetate. |
| 16β-methyl-2β,3α-dibromo-6α,9α-difluoro-allopregnane-11β,17α,21-triol-20-one-21-acetate. | 16β-methyl-6α,9α-difluoro-Δ²-allopregnene-11β,17α,21-triol-20-one-21-acetate. |
| 2β,3α-dibromo-6α,9α-difluoro-allopregnane-11β,16α,17α,21-tetrol-20-one-16,21-diacetate. | 6α,9α-difluoro-Δ²-allopregnene-11β,16α,17α,21-tetrol-20-one-16,21-diacetate. |
| 2β,3α-dibromo-6α-chloro-9α-fluoro-allopregnane-11β,16α,17α,21-tetrol-20-one-16,21-diacetate. | 6α-chloro-9α-fluoro-Δ²-allopregnene-11β,16α,17α,21-tetrol-20-one-16,21-diacetate. |
| 2β,3α-dibromo-6α-chloro-9α-fluoro-allopregnane-11β,17α,21-triol-20-one-21-acetate. | 6α-chloro-9α-fluoro-Δ²-allopregnene-11β,17α,21-triol-20-one-21-acetate. |
| 2β,3α-dibromo-9α-fluoro-allopregnane-11β,17α,21-triol-20-one-21-acetate. | 9α-fluoro-Δ²-allopregnene-11β,17α,21-triol-20-one-21-acetate. |

Example XIV

A solution of 3 g. of 6α,16β-dimethyl-9α-chloro-Δ²-allopregnene-11β,17α,21-triol-20-one-21-acetate obtained in accordance with Example XIII, in 60 cc. of pyridine was added to a mixture of 3 g. of chromic trioxide in 60 cc. of pyridine. The reaction mixture was kept at room temperature overnight. It was then diluted with ethyl acetate, filtered through celite and the filtrate washed well with water, dried and evaporated to dryness. Crystallization from acetone-hexane gave 6α,16β-dimethyl-9α-chloro-Δ²-allopregnene - 17α - 21 - diol - 11,20 - dione-21-acetate.

The starting materials listed below were treated following the above described procedure, affording the products hereinafter set forth:

| Starting compounds | Products |
|---|---|
| 6α,16β-dimethyl-9α-fluoro-Δ²-allopregnene-11β,17α,21-triol-20-one-21-acetate. | 6α,16β-dimethyl-9α-fluoro-Δ²-allopregnene-17α,21-diol-11,20-dione-21-acetate. |
| 16α-methyl-6α-fluoro-9α-chloro-Δ²-allopregnene-11β,17α,21-triol-20-one-21-acetate. | 16α-methyl-6α-fluoro-9α-chloro-Δ²-allopregnene-17α,21-diol-11,20-dione-21-acetate. |
| 16α-methyl-6α,9α-dichloro-Δ²-allopregnene-11β,17α,21-triol-20-one-21-acetate. | 16α-methyl-6α,9α-dichloro-Δ²-allopregnene-17α,21-diol-11,20-dione-21-acetate. |
| 16β-methyl-6α-fluoro-9α-chloro-Δ²-allopregnene-11β,17α,21-triol-20-one-21-acetate. | 16β-methyl-6α-fluoro-9α-chloro-Δ²-allopregnene-17α,21-diol-11,20-dione-21-acetate. |
| 6α-fluoro-9α-chloro-Δ²-allopregnene-11β,16α,17α,21-tetrol-20-one-16,21-diacetate. | 6α-fluoro-9α-chloro-Δ²-allopregnene-16α,17α,21-triol-11,20-dione-16,21-diacetate. |
| 6α,9α-dichloro-Δ²-allopregnene-11β,16α,17α,21-tetrol-20-one-16,21-diacetate. | 6α,9α-dichloro-Δ²-allopregnene-16α,17α,21-triol-11,20-dione-16,21-diacetate. |
| 6α,9α-dichloro-Δ²-allopregnene-11β,17α,21-triol-20-one-21-acetate. | 6α,9α-dichloro-Δ²-allopregnene-17α,21-diol-11,20-dione-21-acetate. |
| 9α-chloro-Δ²-allopregnene-11β,17α,21-triol-20-one-21-acetate. | 9α-chloro-Δ²-allopregnene-17α,21-diol-11,20-dione-21-acetate. |
| 16α-methyl-6α,9α-difluoro-Δ²-allopregnene-11β,17α,21-triol-20-one-21-acetate. | 16α-methyl-6α,9α-difluoro-Δ²-allopregnene-17α,21-diol-11,20-dione-21-acetate. |
| 16α-methyl-6α-chloro-9α-fluoro-Δ²-allopregnene-11β,17α,21-triol-20-one-21-acetate. | 16α-methyl-6α-chloro-9α-fluoro-Δ²-allopregnene-17α,21-diol-11,20-dione-21-acetate. |

| Starting compounds | Products |
|---|---|
| 16β-methyl-6α,9α-difluoro-Δ²-allopregnene-11β,17α,21-triol-20-one-21-acetate. | 16β-methyl-6α,9α-difluoro-Δ²-allopregnene-17α,21-diol-11,20-dione-21-acetate. |
| 6α,9α-difluoro-Δ²-allopregnene-11β,16α,17α,21-tetrol-20-one-16,21-diacetate. | 6α,9α-difluoro-Δ²-allopregnene-16α,17α21-triol-11,20-dione-16,21-diacetate. |
| 6α-chloro-9α-fluoro-Δ²-allopregnene-11β,16α,17α,21-tetrol-20-one-16,21-diacetate. | 6α-chloro-9α-fluoro-Δ²-allopregnene-16α,17α21-triol-11,20-dione-16,21-diacetate. |
| 6α-chloro-9α-fluoro-Δ²-allopregnene-11β,17α,21-triol-20-one-21-acetate. | 6α-chloro-9α-fluoro-Δ²-allopregnene-17α,21-diol-11,20-dione-21-acetate. |
| 9α-fluoro-Δ²-allopregnene-11β,17α,21-triol-20-one-21-acetate. | 9α-fluoro-Δ²-allopregnene-17α,21-diol-11,20-dione-21-acetate. |
| 16α-methyl-6α-fluoro-Δ²-allopregnene-11β,17α,21-triol-20-one-21-acetate. | 16α-methyl-6α-fluoro-Δ²-allopregnene-17α,21-diol-11,20-dione-21-acetate. |
| 16α-methyl-6α-chloro-Δ²-allopregnene-11β,17α,21-triol-20-one-21-acetate. | 16α-methyl-6α-chloro-Δ²-allopregnene-17α,21-diol-11,20-dione-21-acetate. |
| 16β-methyl-6α-fluoro-Δ²-allopregnene-11β,17α,21-triol-20-one-21-acetate. | 16β-methyl-6α-fluoro-Δ²-allopregnene-17α,21-diol-11,20-dione-21-acetate. |
| 6α-fluoro-Δ²-allopregnene-11β,16α,17α,21-tetrol-20-one-16,21-diacetate. | 6α-fluoro-Δ²-allopregnene-16α,17α,21-triol-11,20-dione-16,21-diacetate. |
| 6α-chloro-Δ²-allopregnene-11β,16α,17α,21-tetrol-20-one-16,21-diacetate. | 6α-chloro-Δ²-allopregnene-16α,17α,21-triol-11,20-dione-16,21-diacetate. |
| 6α-chloro-Δ²-allopregnene-11β,17α,21-triol-20-one-21-acetate. | 6α-chloro-Δ²-allopregnene-17α,21-diol-11,20-dione-21-acetate. |
| Δ²-allopregnene-11β,17α,21-triol-20-one-21-acetate | Δ²-allopregnene-17α,21-diol-11,20-dione-21-acetate. |
| 6α,16β-dimethyl-Δ²-allopregnene-11β,17α,21-triol-20-one-21-acetate | 6α,16β-dimethyl-Δ²-allopregnene-17α,21-diol-11,20-dione-21-acetate. |

Example XV

A solution of 1 g. of 6α,16β-dimethyl-9α-chloro-Δ²-allopregnene-17α,21-diol-11,20-dione-21-acetate in 50 cc. of methanol was refluxed for 3 hours with 500 mg. of potassium hydroxide dissolved in 1 cc. of water; it was then poured into ice water, the precipitate collected, washed with water to neutral and dried, thus producing a crude compound which upon recrystallization from methylene chloride-ether afforded 6α,16β-dimethyl-9α-chloro-Δ²-allopregnene-17α,21-diol-11,20-dione.

Following the above technique, there were saponified the starting compounds listed below, thus furnishing the corresponding products hereinafter disclosed:

| Starting compounds | Products |
|---|---|
| 6α,16β-dimethyl-9α-fluoro-Δ²-allopregnene-17α,21-diol-11,20-dione-21-acetate. | 6α,16β-dimethyl-9α-fluoro-Δ²-allopregnene-17α,21-diol-11,20-dione. |
| 16α-methyl-6α-fluoro-9α-chloro-Δ²-allopregnene-17α,21-diol-11,20-dione-21-acetate. | 16α-methyl-6α-fluoro-9α-chloro-Δ²-allopregnene-17α,21-diol-11,20-dione. |
| 16α-methyl-6α,9α-dichloro-Δ²-allopregnene-17α,21-diol-11,20-dione-21-acetate. | 16α-methyl-6α,9α-dichloro-Δ²-allopregnene-17α,21-diol-11,20-dione. |
| 16β-methyl-6α-fluoro-9α-chloro-Δ²-allopregnene-17α,21-diol-11,20-dione-21-acetate. | 16β-methyl-6α-fluoro-9α-chloro-Δ²-allopregnene-17α,21-diol-11,20-dione. |
| 6α-fluoro-9α-chloro-Δ²-allopregnene-16α,17α,21-triol-11,20-dione-16,21-diacetate. | 6α-fluoro-9α-chloro-Δ²-allopregnene-16α,17α,21-triol-11,20-dione. |
| 6α,9α-dichloro-Δ²-allopregnene-16α,17α-triol-11,20-dione-16,21-diacetate. | 6α,9α-dichloro-Δ²-allopregnene-16α,17α,21-triol-11,20-dione. |
| 6α,9α-dichloro-Δ²-allopregnene-17α,21-diol-11,20-dione-21-acetate. | 6α,9α-dichloro-Δ²-allopregnene-17α,21-diol-11,20-dione. |
| 9α-chloro-Δ²-allopregnene-17α,21-diol-11,20-dione-21-acetate. | 9α-chloro-Δ²-allopregnene-17α,21-diol-11,20-dione. |
| 16α-methyl-6α,9α-difluoro-Δ²-allopregnene-11β,17α,21-triol-20-dione-21-acetate. | 16α-methyl-6α,9α-difluoro-Δ²-allopregnene-17α,21-diol-11,20-dione. |
| 16α-methyl-6α-chloro-9α-fluoro-Δ²-allopregnene-17α,21-diol-11,20-dione-21-acetate. | 16α-methyl-6α-chloro-9α-fluoro-Δ²-allopregnene-17α,21-diol-11,20-dione. |
| 16β-methyl-6α,9α-difluoro-Δ²-allopregnene-17α,21-diol-11,20-dione-21-acetate. | 16β-methyl-6α,9α-difluoro-Δ²-allopregnene-17α,21-diol-11,20-dione. |
| 6α,9α-difluoro-Δ²-allopregnene-16α,17α,21-triol-11,20-dione-16,21-diacetate. | 6α,9α-difluoro-Δ²-allopregnene-16α,17α,21-triol-11,20-dione. |
| 6α-chloro-Δ²-allopregnene-16α,17α,21-triol-11,20-dione-16,21-diacetate. | 6α-chloro-Δ²-allopregnene-16α,17α,21-triol-11,20-dione. |
| 6α-chloro-Δ²-allopregnene-17α,21-diol-11,20-dione-21-acetate. | 6α-chloro-Δ²-allopregnene-17α,21-diol-11,20-dione. |
| Δ²-allopregnene-17α,21-diol-11,20-dione-21-acetate. | Δ²-allopregnene-17,21-diol-11,20-dione. |
| 6α,16β-dimethyl-Δ²-allopregnene-17α,21-diol-11,20-dione-21-acetate. | 6α,16β-dimethyl-Δ²-allopregnene-17α,21-diol-11,20-dione. |
| 6α,16β-dimethyl-9α-fluoro-Δ²-allopregnene-11β,17α,21-triol-20-one-21-acetate. | 6α,16β-dimethyl-9α-fluoro-Δ²-allopregnene-11β,17α,21-triol-20-one. |
| 16α-methyl-6α-fluoro-9α-chloro-Δ²-allopregnene-11β,17α,21-triol-20-one-21-acetate. | 16α-methyl-6α-fluoro-9α-chloro-Δ²-allopregnene-11β,17α,21-triol-20-one. |
| 16α-methyl-6α,9α-dichloro-Δ²-allopregnene-11β,17α,21-triol-20-one-21-acetate. | 16α-methyl-6α,9α-dichloro-Δ²-allopregnene-11β,17α,21-triol-20-one. |
| 16β-methyl-6α-fluoro-9α-chloro-Δ²-allopregnene-11β,17α,21-triol-20-one-21-acetate. | 16β-methyl-6α,fluoro-9α-chloro-Δ²-allopregnene-11β,17α,21-triol-20-one. |
| 6α-fluoro-9α-chloro-Δ²-allopregnene-11β,16α,17α,21-tetrol-20-one-16,21-diacetate. | 6α-fluoro-9α-chloro-Δ²-allopregnene-11β,16α,17α,21-tetrol-20-one. |
| 6α,9α-dichloro-Δ²-allopregnene-11β,16α,17α,21-tetrol-20-one-16,21-diacetate. | 6α,9α-dichloro-Δ²-allopregnene-11β,16α,17α,21-tetrol-20-one. |
| 6α,9α-dichloro-Δ²-allopregnene-11β,17α,21-triol-20-one-21-acetate. | 6α,9α-dichloro-Δ²-allopregnene-11β,17α,21-triol-20-one. |
| 9α-chloro-Δ²-allopregnene-11β,17α,21-triol-20-one-21-acetate. | 9α-chloro-Δ²-allopregnene-11β,17α,21-triol-20-one. |
| 16α-methyl-6α,9α-difluoro-Δ²-allopregnene-11β,17α,21-triol-20-one-21-acetate. | 16α-methyl-6α,9α-difluoro-Δ²-allopregnene-11β,17α,21-triol-20-one. |
| 16α-methyl-6α-chloro-9α-fluoro-Δ²-allopregnene-11β,17α,21-triol-20-one-21-acetate. | 16α-methyl-6α-chloro-9α-fluoro-Δ²-allopregnene-11β,17α,21-triol-20-one. |
| 16β-methyl-6α,9α-difluoro-Δ²-allopregnene-11β,17α,21-triol-20-one-21-acetate. | 16β-methyl-6α,9α-difluoro-Δ²-allopregnene-11β,17α,21-triol-20-one. |
| 6α,9α-difluoro-Δ²-allopregnene-11β,16α,17α,21-tetrol-20-one-16,21-diacetate. | 6α,9α-difluoro-Δ²-allopregnene-11β,16α,17α,21-tetrol-20-one. |
| 6α-chloro-9α-fluoro-Δ²-allopregnene-11β,16α,17α,21-tetrol-20-one-16,21-diacetate. | 6α-chloro-9α-fluoro-Δ²-allopregnene-11β,16α,17α,21-tetrol-20-one. |
| 6α-chloro-9α-fluoro-Δ²-allopregnene-11β,17α,21-triol-20-one-21-acetate. | 6α-chloro-9α-fluoro-Δ²-allopregnene-11β,17α,21-triol-20-one. |
| 9α-fluoro-Δ²-allopregnene-11β,17α,21-triol-20-one-21-acetate. | 9α-fluoro-Δ²-allopregnene-11β,17α,21-triol-20-one. |
| 6α,16β-dimethyl-9α-chloro-Δ²-allopregnene-11β,17α,21-triol-20-one-21-acetate. | 6α,16β-dimethyl-9α-chloro-Δ²-allopregnene-11β,17α,21-triol-20-one. |

Example XVI

A mixture of 1 g. of 6α,16β-dimethyl-9α-chloro-Δ²-allopregnene-17α,21-diol-11,20-dione, 4 cc. of pyridine and 2 cc. of propionic anhydride was kept at room temperature overnight, poured into ice water, the formed precipitate was filtered, washed with water and dried. Crystallization from acetone-hexane gave 6α,16β-dimethyl-9α-chloro-Δ²-allopregnene-17α,21-diol-11,20-dione-21-propionate.

When applying the above procedure to the hereinafter listed starting compounds, there were obtained the respective products set forth below:

| Starting compounds | Products |
|---|---|
| 6α,16β-dimethyl-9α-fluoro-Δ²-allopregnene-17α,21-diol-11,20-dione. | 21-propionate of 6α,16β-dimethyl-9α-fluoro-Δ²-allopregnene-17α,21-diol-11,20-dione. |
| 16α-methyl-6α-fluoro-9α-chloro-Δ²-allopregnene-17α,21-diol-11,20-dione. | 21-propionate of 16α-methyl-6α-fluoro-9α-chloro-Δ²-allopregnene-17α,21-diol-11,20-dione. |
| 16α-methyl-6α,9α-dichloro-Δ²-allopregnene-17α,21-diol-11,20-dione. | 21-propionate of 16α-methyl-6α,9α-dichloro-Δ²-allopregnene-17α,21-diol-11,20-dione. |
| 16β-methyl-6α-fluoro-9α-cholro-Δ²-allopregnene-17α,21-diol-11,20-dione. | 21-propionate of 16β-methyl-6α-fluoro-9α-chloro-Δ²-allopregnene-17α,21-diol-11,20-dione. |
| 6α-fluoro-9α-chloro-Δ²-allopregnene-16α,17α,21-triol-11,20-dione. | 16,21-dipropionate of 6α-fluoro-9α-chloro-Δ²-allopregnene-16α,17α,21-triol-11,20-dione. |

| Starting compounds | Products |
|---|---|
| 6α,9α-dichloro-Δ²-allopregnene-16α,17α,21-triol-11,20-dione. | 16,21-dipropionate of 6α,9α-dichloro-Δ²-allopregnene-16α,17α,21-triol-11,20-dione. |
| 6α,9α-dichloro-Δ²-allopregnene-17α,21-diol-11,20-dione. | 21-propionate of 6α,9α-dichloro-Δ²-allopregnene-17α,21-diol-11,20-dione. |
| 9α-chloro-Δ²-allopregnene-17α,21-diol-11,20-dione. | 21-propionate of 9α-chloro-Δ²-allopregnene-17α,21-diol-11,20-dione. |
| 16α-methyl-6α,9α-difluoro-Δ²-allopregnene-17α,21-diol-11,20-dione. | 21-propionate of 16α-methyl-6α,9α-difluoro-Δ²-allopregnene-17α,21-diol-11,21-dione. |
| 16α-methyl-6α-chloro-9α-fluoro-Δ²-allopregnene-17α,21-diol-11,20-dione. | 21-propionate of 16α-methyl-6α-chloro-9α-fluoro-Δ²-allopregnene-17α,21-diol-11,20-dione. |
| 16β-methyl-6α,9α-difluoro-Δ²-allopregnene-17α,21-diol-11,20-dione. | 21-propionate of 16β-methyl-6α,9α-difluoro-Δ²-allopregnene-17α,21-diol-11,20-dione. |
| 6α,9α-difluoro-Δ²-allopregnene-16α,17α,21-triol-11,20-dione. | 16,21-dipropionate of 6α,9α-difluoro-Δ²-allopregnene-16α,17α,21-triol-11,20-dione. |
| 6α-chloro-9α-fluoro-Δ²-allopregnene-16α,17α,21-triol-11,20-dione. | 16,21-dipropionate of 6α-chloro-9α-fluoro-Δ²-allopregnene-16α,17α,21-triol-11,20-dione. |
| 6α-chloro-9α-fluoro-Δ²-allopregnene-17α,21-diol-11,20-dione. | 21-propionate of 6α-chloro-9α-fluoro-Δ²-allopregnene-17α,21-diol-11,20-dione. |
| 9α-fluoro-Δ²-allopregene-17α,21-diol-11,20-dione. | 21-propionate of 9α-fluoro-Δ²-allopregnene-17α,21-diol-11,20-dione. |
| 16α-methyl-6α-fluoro-Δ²-allopregnene-17α,21-diol-11,20-dione. | 21-propionate of 16α-methyl-6α-fluoro-Δ²-allopregnene-17α,21-diol-11,20-dione. |
| 16α-methyl-6α-chloro-Δ²-allopregnene-17α-21,diol-11,20-dione. | 21-propionate of 16α-methyl-6α-chloro-Δ²-allopregnene-17α,21-diol-11,20-dione. |
| 16β-methyl-6α-fluoro-Δ²-allopregnene-17α,21-diol-11,20-dione. | 21-propionate of 16β,methyl-6α-fluoro-Δ²-allopregnene-17α,21-diol-11,20-dione. |
| 6α-fluoro-Δ²-allopregnene-16α,17α,21-triol-11,20-dione. | 16,21-dipropionate of 6α-fluoro-Δ²-allopregnene-16α,17α,21-triol-11,20-dione. |
| 6α-chloro-Δ²-allopregnene-16α,17α,21-triol-11,20-dione. | 16,21-dipropionate of 6α-chloro-Δ²-allopregnene-16α,17α,21-triol-11,20-dione. |
| 6α-chloro-Δ²-allopregnene-17α,21-diol-11,20-dione. | 21-propionate of 6α-chloro-Δ²-allopregnene-17α,21-diol-11,20-dione. |
| Δ²-allopregnene-17,21-diol-11,20-dione. | 21-propionate of Δ²-allopregnene-17,21-diol-11,20-dione. |
| 6α,16β-dimethyl-Δ²-allopregnene-17α,21-diol-11,20-dione. | 21-propionate of 6α,16β-dimethyl-Δ²-allopregnene-17α,21-diol-11,20-dione. |
| 6α,16β-dimethyl-9α-fluoro-Δ²-allopregnene-11β,17α,21-triol-20-one. | 21-propionate of 6α,16β-dimethyl-9α-fluoro-Δ²-allopregnene-11β,17α,21-triol-20-one. |
| 16α-methyl-6α-fluoro-9α-chloro-Δ²-allopregnene-11β,17α,21-triol-20-one. | 21-propionate of 16α-methyl-6α-fluoro-9α-chloro-Δ²-allopregnene-11β,17α,21-triol-20-one. |
| 16α-methyl-6α,9α-dichloro-Δ²-allopregnene-11β,17α,21-triol-20-one. | 21-propionate of 16α-methyl-6α,9α-dichloro-Δ²-allopregnene-11β,17α,21-triol-20-one. |
| 16β-methyl-6α-fluoro-9α-chloro-Δ²-allopregnene-11β,17α,21-triol-20-one. | 21-propionate of 16β-methyl-6α-fluoro-9α-chloro-Δ²-allopregnene-11β,17α,21-triol-20-one. |
| 6α-fluoro-9α-chloro-Δ²-allopregnene-11β,16α,17α,21-tetrol-20-one. | 16,21-dipropionate of 6α-fluoro-9α-chloro-Δ²-allopregnene-11β,16α,17α,21-tetrol-20-one. |
| 6α,9α-dichloro-Δ²-allopregnene-11β,16α,17α,21-tetrol-20-one. | 16,21-dipropionate of 6α,9α-dichloro-Δ²-allopregnene-11β,16α,17α,21-tetrol-20-one. |
| 6α,9α-dichloro-Δ²-allopregnene-11β,17α,21-triol-20-one. | 21-propionate of 6α,9α-dichloro-Δ²-allopregnene-11β,17α,21-triol-20-one. |
| 9α-chloro-Δ²-allopregnene-11β,17α,21-triol-20-one. | 21-propionate of 9α-chloro-Δ²-allopregnene-11β,17α,21-triol-20-one. |
| 16α-methyl-6α,9α-difluoro-Δ²-allopregnene-11β,17α,21-triol-20-one. | 21-propionate of 16α-methyl-6α,9α-difluoro-Δ²-allopregnene-11β,17α,21-triol-20-one. |
| 16α-methyl-6α-chloro-9α-fluoro-Δ²-allopregnene-11β,17α,21-triol-20-one. | 21-propionate of 16α-methyl-6α-chloro-9α-fluoro-Δ²-allopregnene-11β,17α,21-triol-20-one. |
| 16β-methyl-6α,9α-difluoro-Δ²-allopregnene-11β,17α,21-triol-20-one. | 21-propionate of 16β-methyl-6α,9α-difluoro-Δ²-allopregnene-11β,17α,21-triol-20-one. |
| 6α,9α-difluoro-Δ²-allopregnene-11β,16α,17α,21-tetrol-20-one. | 16,21-dipropionate of 6α,9α-difluoro-Δ²-allopregnene-11β,16α,17α,21-tetrol-20-one. |
| 6α-chloro-9α-fluoro-Δ²-allopregnene-11β,16α,17α,21-tetrol-20-one. | 16,21-dipropionate of 6α-chloro-9α-fluoro-Δ²-allopregnene-11β,16α,17α,21-tetrol-20-one. |
| 6α-chloro-9α-fluoro-Δ²-allopregnene-11β,17α,21-triol-20-one. | 21-propionate of 6α-chloro-9α-fluoro-Δ²-allopregnene-11β,17α,21-triol-20-one. |
| 9α-fluoro-Δ²-allopregnene-11β,17α,21-triol-20-one. | 21-propionate of 9α-fluoro-Δ²-allopregnene-11β,17α,21-triol-20-one. |
| 6α,16β-dimethyl-9α-chloro-Δ²-allopregnene-11β,17α,21-triol-20-one. | 21-propionate of 6α,16β-dimethyl-9α-chloro-Δ²-allopregnene-11β,17α,21-triol-20-one. |
| 16α-methyl-6α-fluoro-Δ²-allopregnene-11β,17α,21-triol-20-one. | 21-propionate of 16α-methyl-6α-fluoro-Δ²-allopregnene-11β,17α,21-triol-20-one. |
| 16α-methyl-6α-chloro-Δ²-allopregnene-11β,17α,21-triol-20-one. | 21-propionate of 16α-methyl-6α-chloro-Δ²-allopregnene-11β,17α,21-triol-20-one. |
| 16β-methyl-6α-fluoro-Δ²-allopregnene-11β,17α,21-triol-20-one. | 21-propionate of 16β-methyl-6α-fluoro-Δ²-allopregnene-11β,17α,21-triol-20-one. |
| 6α-fluoro-Δ²-allopregnene-11β,16α,17α,21-tetrol-20-one. | 16,21-dipropionate of 6α-fluoro-Δ²-allopregnene-11β,16α,17α,21-tetrol-20-one. |
| 6α-chloro-Δ²-allopregnene-11β,16α,17α,21-tetrol-20-one. | 16,21-dipropionate of 6α-chloro-Δ²-allopregnene-11β,16α,17α,21-tetrol-20-one. |
| 6α-chloro-Δ²-allopregnene-11β,17α,21-triol-20-one. | 21-propionate of 6α-chloro-Δ²-allopregnene-11β,17α,21-triol-20-one. |
| Δ²-allopregnene-11β,17α,21-triol-20-one. | 21-propionate of Δ²-allopregnene-11β,17α,21-triol-20-one. |
| 6α,16β-dimethyl-Δ²-allopregnene-11β,17α,21-triol-20-one. | 21-propionate of 6α,16β-dimethyl-Δ²-allopregnene-11β,17α,21-triol-20-one. |

Example XVII

Using the same conditions described in the foregoing example but substituting propionic anhydride by caproic anhydride, cyclopentylpropionic anhydride and benzoyl chloride, there were correspondingly obtained the caproates, cyclopentylpropionates and benzoates of the named starting materials.

We claim:

1. A compound of the following formula:

$$\begin{array}{c} CH_2OR^1 \\ C=O \\ ---OH \\ X= \quad \quad \text{\textasciitilde} R \\ \\ Y \\ \\ Z \end{array}$$

wherein X is selected from the group consisting of $$\diagup^{OH}_{H} \quad \text{and} \quad =O$$

Y is a member of the group consisting of hydrogen, fluorine and chlorine; Z is selected from the group consisting of hydrogen, fluorine, chlorine and methyl; R is a member of the group consisting of hydrogen, α-methyl, β-methyl, α-hydroxy and α-hydrocarbon carboxylic acyloxy of less than 12 carbon atoms; and $R^1$ is selected from the group consisting of hydrogen and a hydrocarbon carboxylic acyl group of less than 12 carbon atoms.

2. Δ²-allopregnene-11β,17α,21-triol-20-one.

3. Δ²-allopregnene-17α,21-diol-11,20-dione.

4. 6α,16β-dimethyl-9α-fluro-Δ² - allopregnene - 17α,21-diol-11,20-dione.

5. 16α-methyl-6α-fluoro-9α-chloro-Δ²-allopregnene-17α, 21-diol-11,20-dione.

6. 16α-methyl-6α,9α-dichloro-Δ²-allopregnene - 17α,21-diol-11,20-dione.

7. 16β-methyl-6α-fluoro-9α-chloro-Δ²-allopregnene-17α, 21-diol-11,20-dione.

8. 6α-fluoro-9α-chloro - Δ² - allopregnene - 16α, 17α,21-triol-11,20-dione.

9. 6α,9α-difluoro-Δ² - allopregnene - 16α,17α,21 - triol-11,20-dione.

10. 16α-methyl-6α-chloro - Δ² - allopregnene - 17α,21-diol-11,20-dione.

11. 16β-methyl-6α-fluoro-Δ²-allopregnene-17α,21 - diol-11,20-dione.

12. 6α,16β-dimethyl-9α-chloro-Δ² - allopregnene - 11β, 17α,21-triol-20-one.

13. 16α-methyl-6α-fluoro-9α-chloro - Δ² - allopregnene-11β,17α,21-triol-20-one.

14. 16α-methyl-6α,9α-dichloro-Δ² - allopregnene - 11β, 17α,21-triol-20-one.

15. 16$\beta$-methyl-6$\alpha$-fluoro-9$\alpha$-chloro - $\Delta^2$ - allopregnene-11$\beta$,17$\alpha$,21-triol-20-one.

16. 6$\alpha$-fluoro-9$\alpha$-chloro-$\Delta^2$-allopregnene - 11$\beta$,16$\alpha$,17$\alpha$,21-tetrol-20-one.

17. 6$\alpha$,9$\alpha$-difluoro - $\Delta^2$ - allopregnene - 11$\beta$,16$\alpha$,17$\alpha$,21-tetrol-20-one.

18. 16$\alpha$-methyl-6$\alpha$-chloro-$\Delta^2$-allopregnene - 11$\beta$,17$\alpha$,21-triol-20-one.

19. 16$\beta$-methyl-6$\alpha$-fluoro-$\Delta^2$-allopregnene - 11$\beta$,17$\alpha$,21-triol-20-one.

20. 16$\beta$-methyl-6$\alpha$,9$\alpha$-difluoro - $\Delta^2$ - allopregnene - 11$\beta$,17$\alpha$,21-triol-20-one.

No references cited.